(12) United States Patent
Smirnov

(10) Patent No.: US 8,861,129 B2
(45) Date of Patent: Oct. 14, 2014

(54) SPINDLE MOTOR HAVING ENHANCED BEARING RIGIDITY AND INCREASED STORAGE SPACE FOR LUBRICATING FLUID AND HARD DISK DRIVE INCLUDING THE SAME

(71) Applicant: Samsung Electro-Mechanics Co., Ltd., Suwon (KR)

(72) Inventor: Viatcheslav Smirnov, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/765,881

(22) Filed: Feb. 13, 2013

(65) Prior Publication Data
US 2014/0160593 A1    Jun. 12, 2014

(30) Foreign Application Priority Data
Dec. 10, 2012    (KR) .................. 10-2012-0142924

(51) Int. Cl.
*G11B 19/20* (2006.01)
*H02K 7/08* (2006.01)
*H02K 5/167* (2006.01)
*H02K 5/16* (2006.01)

(52) U.S. Cl.
CPC ............ *H02K 5/165* (2013.01); *H02K 5/1675* (2013.01); *G11B 19/2009* (2013.01)
USPC ........ 360/98.07; 360/99.08; 310/90; 310/425

(58) Field of Classification Search
USPC ........... 360/98.07, 99.08, 97.08; 310/90, 418, 310/425
See application file for complete search history.

(56) References Cited

U.S. PATENT DOCUMENTS

| 8,395,861 | B2 * | 3/2013 | Tashiro ................. 360/99.08 |
| 8,451,558 | B2 * | 5/2013 | Watanabe et al. ......... 360/99.08 |
| 8,508,884 | B2 * | 8/2013 | Sekii et al. ............... 360/99.08 |
| 2001/0007519 | A1 * | 7/2001 | Nishio et al. ............... 360/99.08 |
| 2005/0116564 | A1 | 6/2005 | Tokunaga et al. |
| 2011/0158080 | A1 * | 6/2011 | Yoon ........................ 369/266 |
| 2012/0213459 | A1 | 8/2012 | Yamada et al. |
| 2012/0248914 | A1 * | 10/2012 | Yoo et al. ................. 310/154.07 |

FOREIGN PATENT DOCUMENTS

| JP | 2004-328926 | 11/2004 |
| JP | 2012-175838 | 9/2012 |

* cited by examiner

*Primary Examiner* — Jefferson Evans
(74) *Attorney, Agent, or Firm* — Staas & Halsey LLP

(57) ABSTRACT

There is provided a spindle motor including: a shaft including a body portion and an extending portion extending from an upper portion of the body portion in an outer radial direction; a sleeve rotatably supporting the shaft; a rotor rotating in conjunction with the shaft and having a stopper portion facing an outer circumferential surface of the sleeve; and a cover plate coupled to the sleeve, while maintaining a gap with lower portions of the shaft and the sleeve, wherein the cover plate includes an airtight portion disposed below the shaft and the sleeve, an inner wall portion extending from the airtight portion in an axial direction and coupled to an outer circumferential surface of the sleeve, an outer wall portion coupled to a base member, and an upper wall portion connecting an upper end of the inner wall portion and an upper end of the outer wall portion.

14 Claims, 6 Drawing Sheets

SPINDLE MOTOR HAVING ENHANCED BEARING RIGIDITY AND INCREASED STORAGE SPACE FOR LUBRICATING FLUID AND HARD DISK DRIVE INCLUDING THE SAME

CROSS-REFERENCE TO RELATED APPLICATIONS

This application claims the priority of Korean Patent Application No. 10-2012-0142924 filed on Dec. 10, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A hard disk drive (HDD), an information storage device, is a device for reading data stored on a disc or writing data to a disc with a read/write head.

A hard disk drive requires a disc driving device for driving a disc, and a small spindle motor is used in the disc driving device.

A spindle motor employs a fluid dynamic bearing assembly (or a hydrodynamic bearing assembly), in which a lubricating fluid is interposed between a shaft, a rotary member of the fluid dynamic bearing assembly, and a sleeve, a fixed member of the fluid dynamic bearing assembly, and the shaft is supported by fluid pressure generated in the lubricating fluid.

Spindle motors are required to have high capacity and to be thinned, and as spindle motors are thinned and reduced in size, bearing rigidity is inevitably weakened.

Bearing rigidity is an important factor determining rotational characteristics of spindle motors, affected by an interval between dynamic pressure generating grooves, i.e., a length of a bearing span.

Namely, as the length of the bearing span is increased, bearing rigidity is increased to enhance rotational characteristics of a motor, and thus, even in the case that a motor has high capacity and is thinned, the bearing rigidity may not be affected.

Also, when an external impact, or the like, is applied while a spindle motor is being driven, an internal component may be deformed to negatively affect the driving of the spindle motor, so it is important to secure rigidity of the spindle motor.

Also, a lubricating fluid injected into a fluid dynamic bearing assembly may be leaked to outside or an amount of the lubricating fluid may be reduced due to evaporation, reducing pressure generation in a fluid dynamic bearing and leading to a problem with performance and a life span of the spindle motor.

Thus, research into a spindle motor that may have high capacity and be thin without degrading bearing rigidity, have rigidity sufficient to allow an internal component thereof to resist deformation in spite of external impact applied thereto, and have performance and life span maximized by securing a storage space of a lubricating fluid is urgently required to be conducted.

SUMMARY OF THE INVENTION

An aspect of the present invention provides a spindle motor having enhanced rigidity, having enhanced bearing rigidity in spite of being small and thin, and having an increased storage space for a lubricating fluid, and a hard disk drive including the same.

Another aspect of the present invention provides a spindle motor including a reduced amount of internal components, thus simplifying a manufacturing process and reducing manufacturing costs, and a hard disk drive including the same.

According to an aspect of the present invention, there is provided a spindle motor including: a shaft including a body portion and an extending portion extending from an upper portion of the body portion in an outer radial direction; a sleeve rotatably supporting the shaft; a rotor rotating in conjunction with the shaft and having a stopper portion facing an outer circumferential surface of the sleeve; and a cover plate coupled to the sleeve, while maintaining a gap with lower portions of the shaft and the sleeve, wherein the cover plate includes an airtight portion disposed below the shaft and the sleeve, an inner wall portion extending from the airtight portion in an axial direction and coupled to an outer circumferential surface of the sleeve, an outer wall portion coupled to the base member, and an upper wall portion connecting an upper end of the inner wall portion and an upper end of the outer wall portion.

The outer circumferential surface of the sleeve and the inner circumferential surface of the stopper portion may be tapered, and a lower surface of the stopper portion and an upper surface of the upper wall portion may be flat surfaces, respectively.

The lower surface of the stopper portion and the upper surface of the upper wall portion may be disposed to face one another.

The lower surface of the stopper portion and the upper surface of the upper wall portion may be tapered.

An oil sealing portion may be formed between the lower surface of the stopper portion and the upper surface of the upper wall portion to seal a lubricating fluid therein.

The lower surface of the stopper portion and the upper surface of the upper wall portion may be sloped downwardly toward an outer edge in the radial direction.

A damping member may be provided in a space surrounded by the inner wall portion, the upper wall portion, and the outer wall portion.

The shaft may further include a protrusion portion extending from an end of the extending portion in the axial direction, and the extending portion and the protrusion portion may be coupled to the rotor.

The spindle motor may satisfy conditional expressions 1 to 5 below.

| | |
|---|---|
| $0.2 \times T \leq t1 \leq 1.0 \times T$ | [Conditional expression 1] |
| $0.5 \times T \leq t2 \leq 1.0 \times T$ | [Conditional expression 2] |
| $2.2 \times d1 \leq D1 \leq 3.5 \times d1$ | [Conditional expression 3] |
| $1.7 \times d1 \leq D2 \leq 3.0 \times d1$ | [Conditional expression 4] |
| $0.3 \times d1 \leq H1 \leq 0.8 \times d1$ | [Conditional expression 5] |

Here, d1 is a diameter of the body portion of the shaft, D1 is a distance from the center of the shaft to the outer circumferential surface of the outer wall portion, D2 is a distance from the center of the shaft to the inner circumferential surface of the inner wall portion, D3 is a distance from the inner circumferential surface of a mounting portion to an outer circumferential surface of the mounting portion, H1 is a distance from the upper surface of the airtight portion to the upper surface of the upper wall portion, t1 is a thickness of the airtight portion, t2 is a distance from the inner circumferential surface of the inner wall portion or the outer wall portion to an outer circumferential surface thereof, and T is a thickness of the upper wall portion.

According to another aspect of the present invention, there is provided a spindle motor including: a sleeve rotatably supporting the shaft; a rotor coupled to an upper end of the shaft and rotating in conjunction therewith; a stopper portion coupled to a main wall portion protruded from one surface of the rotor and facing an outer circumferential surface of the sleeve; and a cover plate coupled to the sleeve, while maintaining a gap with lower portions of the shaft and the sleeve, wherein the cover plate has an inner wall portion extending from the airtight portion in an axial direction and coupled to an outer circumferential surface of the sleeve, an outer wall portion coupled to the base member, and an upper wall portion connecting an upper end of the inner wall portion and an upper end of the outer wall portion.

The lower surface of the stopper portion and the upper surface of the upper wall portion may be disposed to face one another.

The lower surface of the stopper portion and the upper surface of the upper wall portion may be tapered.

An oil sealing portion may be formed between the lower surface of the stopper portion and the upper surface of the upper wall portion to seal a lubricating fluid therein.

The lower surface of the stopper portion and the upper surface of the upper wall portion may be sloped downwardly toward an outer edge in the radial direction.

According to another aspect of the present invention, there is provided a hard disk drive including: a spindle motor rotating a disk by power applied through a board; a magnetic head writing data to or reading data from the disk; and a head driving unit transferring the magnetic head to a certain position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
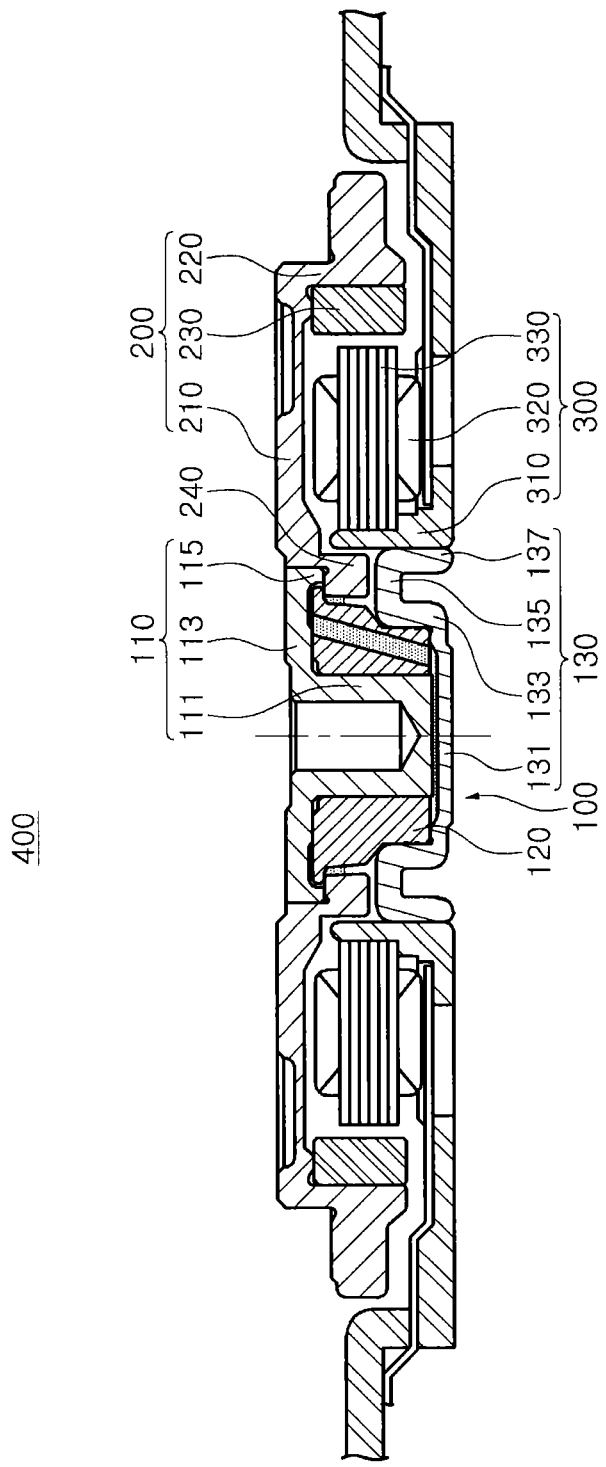
FIG. 1 is a schematic cross-sectional view of a spindle motor according to a first embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
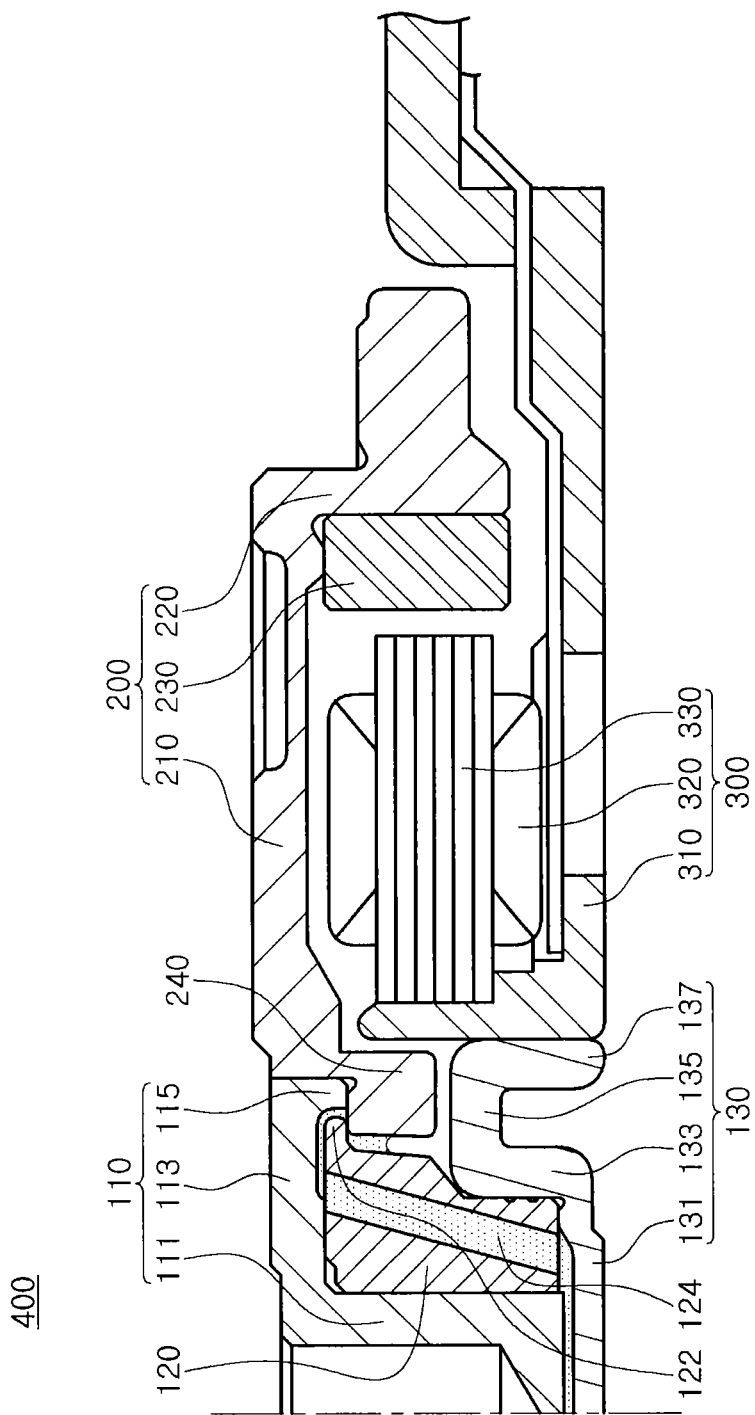
FIG. 2 is a cross-sectional view of half of the spindle motor according to the first embodiment of the present invention.

FIG. 1 is a schematic cross-sectional view of a spindle motor according to a first embodiment of the present invention. FIG. 2 is a cross-sectional view of half of the spindle motor according to the first embodiment of the present invention.

Referring to FIGS. 1 and 2, a spindle motor 400 according to a first embodiment of the present invention may include a fluid dynamic bearing assembly 100, a stator 300 as a fixed member, and a rotor 200 as a rotating member.

First, referring to definitions of directional terms, an axial direction may refer to a vertical direction based on a shaft 110, and an outer and inner radial direction may refer to an outer edge direction of the a rotor 200 based on the shaft 110 or a central direction of the shaft 110 based on an outer edge of the rotor 200, respectively.

The fluid dynamic bearing assembly 100 may include a shaft 110, a sleeve 120, and a cover plate 130.

The shaft 110 may be a rotating member rotating in conjunction with the rotor 200.

The shaft 110 may include a body portion 111 inserted into an axial hole of the sleeve 120 and an extending portion 113 extending from an upper end of the body portion 111 in the outer radial direction.

Here, the extending portion 113 may be provided such that an end thereof is formed on an outer side in the radial direction, relative to an outer circumferential surface of the sleeve 120, and the end of the extending portion 113 may be combined to the rotor 200.

Thus, the extending portion 113 and the rotor 200 may be combined in an outer side in the radial direction, relative to the outer circumferential surface of the sleeve 120.

Here, the shaft 110 may further include a protrusion 115 extending from an end of the extending portion in the axial direction in order to increase a coupling area with the rotor 200.

Namely, an outer circumferential surface of the extending portion 113 and an outer circumferential surface and a lower surface of the protrusion 115 are coupled to the rotor 200, a coupling area of the shaft 110 and the rotor 200 may be increased to enhance bonding force of the shaft 110 and the rotor 200.

Thus, since the shaft 110 and the rotor 200 are stably coupled, rigidity of the spindle motor 400 may be enhanced.

Here, if the shaft 110 and the rotor 200 are coupled in an upper portion of an inner edge of the sleeve, an axial directional length of the sleeve equivalent to a length by which the shaft 110 and the rotor 200 are coupled in the axial direction may be inevitably reduced.

Here, in terms of compactness and thinness of the spindle motor, there is a limitation in increasing the axial directional length of the sleeve.

Namely, since increasing an overall height of the spindle motor is limited, if the shaft 110 and the rotor 200 are coupled in an upper portion of the inner edge of the sleeve 120, an axial direction length of the sleeve 120 cannot be sufficiently secured.

However, if the axial directional length of the sleeve 120 is reduced, a length of a bearing span is reduced by as much, weakening radial dynamic pressure supporting rotation of the shaft 110.

The length of a bearing span refers to a distance between points at which maximum pressure is generated by the radial dynamic pressure portion.

As the distance is longer, rotation of the shaft 110 may be stably supported, and if the length of the bearing span is short, partial disposition (or eccentricity) may occur when the shaft 110 rotates and bearing rigidity may be weakened.

Thus, in the spindle motor 400 according to the first embodiment of the present invention, in order to secure bearing rigidity while the spindle motor 400 is reduced in size and thinner, the shaft 110 and the rotor 200 are coupled in an outer side in the radial direction, relative to the outer circumferential surface of the sleeve 120.

Thus, without changing an overall height of the spindle motor 400, the axial direction length of the sleeve 120 can be increased.

Also, the axial directional length of the sleeve 120 may be increased, while reducing the overall height of the spindle motor, by reducing a thickness of the extending portion 113 extending from an upper end of the body portion 111 of the shaft 110.

Thus, although the spindle motor 400 according to the first embodiment of the present invention may be implemented to be smaller and thinner, the bearing rigidity can be enhanced by increasing the length of the bearing span.

The sleeve 120 may support the shaft 110 such that the shaft 110 rotates. The sleeve 120 may be formed by forging copper (Cu) or aluminum (Al) or sintering Cu—Fe-based alloy powder or SUS-based powder.

Here, the shaft 110 is inserted to have a micro-clearance with a shaft hole of the sleeve 120, and a lubricating fluid is provided in the micro-clearance. A rotation of the shaft 110 may be more smoothly supported by radial dynamic pressure generating grooves (not shown) formed in at least one of the outer diameter of the shaft 110 and an inner diameter of the sleeve 120.

The radial dynamic pressure generating grooves (not shown) may be formed in an inner circumferential surface of the sleeve 120, i.e., the interior of the shaft hole of the sleeve 120, and form pressure allowing the shaft 110 to be spaced apart from the inner circumferential surface of the sleeve 120 by a certain interval so as to rotate smoothly.

However, without being limited to the configuration in which the radial dynamic pressure generating grooves (not shown) are formed on the inner circumferential surface of the sleeve 120 as mentioned above, the radial dynamic pressure generating grooves (not shown) may be provided in an outer circumferential surface of the shaft 110 and an amount of the radial dynamic pressure generating grooves is not limited.

The radial dynamic pressure generating grooves (not shown) may have any one of a herringbone shape, a spiral shape, and a helical shape, and the shape of the radial dynamic pressure generating grooves is not limited as long as it can generate radial dynamic pressure.

Also, thrust dynamic pressure grooves (not shown) may be formed in at least one of an upper surface of the sleeve 120 and one surface of the extending portion of the shaft 110 facing the upper surface of the sleeve 120. By virtue of the thrust dynamic pressure grooves (not shown), the shaft 110 may rotate in conjunction with the rotor 200, while maintaining a predetermined degree of levitation force.

Here, like the radial dynamic pressure grooves (not shown), the thrust dynamic pressure grooves (not shown) may have a herringbone shape, a spiral shape, or a helical shape, but the present invention is not limited thereto and the thrust dynamic pressure grooves (not shown) may have any shape as long as it can provide thrust dynamic pressure.

Also, at least one bypass flow channel 124 may be formed in the sleeve 120 and connect upper and lower portions of the sleeve 120.

The bypass flow channel 126 may disperse pressure of a lubricating fluid to balance pressure therein, and allow bubbles existing within the lubricating fluid to move so as to be expelled through circulation.

The cover plate 130 may be coupled to the sleeve, while maintaining a gap with lower portions of the shaft 110 and the sleeve 120.

The cover plate 130 may support a lower surface of the shaft 110 by accommodating a lubricating fluid in the gap formed between the cover plate 130 and the sleeve 120.

Here, the cover plate 130 may be fixed according to various methods such as welding, caulking, bonding, or the like. A method of fixing the cover plate 130 may be selectively applied according to a structure and a process of a product.

A specific shape of the cover plate 130 will be described later.

The stator 300 may include a coil 320, a core 330, and a base member 310.

The stator 300 is a fixed structure having the core 330 around which the coil 320 generating electromagnetic force having a predetermined magnitude when power is applied thereto is wound.

The core 330 may be fixedly disposed on a base member 310 in which a printed circuit board (PCB) (not shown) with a pattern circuit printed thereon. A plurality of coil holes having a predetermined size may be formed in an upper surface of the base member 310 in a penetrative manner, corresponding to the core 330 around which the coil 320 is wound, such that the coil is exposed downwardly. The coil 320 may be electrically connected to the PCB (not shown) such that external power is applied thereto.

The base member 310 may be made of aluminum (Al) and formed through a die-casting method. The base member 310 may be fabricated by performing plastic working (or press working) on a steel sheet.

The rotor 200 may be a rotating structure which is rotatably provided with respect to the stator 300. The rotor 200 may have an annular magnet 220 formed on an inner circumferential surface thereof. The annular magnet 220 may correspond to the core 330 with a predetermined space therebetween.

Here, the rotor 200 may include a disk portion 210 fixedly coupled to the extending portion of the shaft 110 and a magnet support portion 220 bent downwardly from the disk portion 210 in an axial direction and supporting the magnet 230.

The magnet 230 may be provided as a permanent magnet having an N pole and an S pole alternately magnetized in the circumferential direction to generate magnetic force having a predetermined magnitude.

A rotational driving of the rotor 200 will be described briefly. When power is supplied to the coil 320 wound around the core 330, driving force (or power) is generated, allowing the rotor 200 to rotate according to electromagnetic interaction between the magnet 230 and the core 330 with the coil 320 wound therearound.

Accordingly, the rotor 200 rotates, and accordingly, the shaft 110 to which the rotor 200 is fixedly coupled is rotated in conjunction with the rotor 200.

The rotor 200 may have a stopper portion 240 extending from the disk portion 210 and be disposed to face an outer circumferential surface of the sleeve 120.

A lubricating fluid may be sealed between an inner circumferential surface of the stopper 240 and an outer circumferential surface of the sleeve 120.

The inner circumferential surface of the stopper portion 240 and the outer circumferential surface of the sleeve 120 corresponding to the inner circumferential surface of the stopper portion 240 may be formed to be sloped to allow the lubricating fluid to be sealed therebetween.

In detail, as illustrated in FIG. 2, the outer circumferential surface of the sleeve 120 and the inner circumferential surface of the stopper portion 240 may be sloped downwardly in an inner radial direction.

Here, the sleeve 120 may have a flange portion 122 formed on an upper portion thereof. The flange portion 122 may be protruded in an outer radial direction, and a lower surface of the flange portion 122 may face a portion of an upper surface of the stopper portion 240.

Thus, when the shaft 110 and the rotor 200, rotating members, excessively float, a portion of the upper surface of the stopper portion 240 is caught by the flange portion 122, preventing the rotating members from floating excessively.

The cover plate 130 may include an airtight portion 131 disposed below the shaft 110 and the sleeve 120, an inner wall portion 133 extending from the airtight portion 131 in the axial direction and coupled to an outer circumferential surface of the sleeve 120, an outer wall portion 137 coupled to the base member 310, and an upper wall portion 135 connecting an upper end of the inner wall portion 133 and an upper end of the outer wall portion 137.

The airtight portion 131 may be disposed to maintain a gap with the shaft 110 and the sleeve 120, and the inner wall portion 133 may extend from the airtight portion 131 in the axial direction.

The inner wall portion 133 may coupled to the outer circumferential surface of the sleeve 120 to fix the sleeve 120.

In detail, an inner circumferential surface of the inner wall portion 133 and an outer circumferential surface of the sleeve 120 may be coupled, and in this case, the inner circumferential surface of the inner wall portion 133 and the outer circumferential surface of the sleeve 120 through at least one of sliding, bonding, welding, and press-fitting methods.

The outer wall portion 137 may be coupled to an inner circumferential surface of the base member 310 fixing the core 330 around which the coil 320 is wound, and the outer circumferential surface of the outer wall portion 137 and the inner circumferential surface of the base member 310 may be coupled according to at least one of sliding, bonding, welding, and press-fitting methods.

The upper wall portion 135 may be configured to connect an upper end of the inner wall portion 133 and an upper end of the outer wall portion 137, and an upper surface of the upper wall portion 135 may be formed as a flat surface.

Here, the cover plate 130 may be formed by plastic-deforming a steel sheet. In detail, a basic configuration of the cover plate 130 is fabricated through press working, and subsequently bent or cut as follow-up working to fabricate a final configuration of the cover plate 130.

Namely, the cover plate 130 according to an embodiment of the present invention may be produced by performing plastic working such as press working, or the like, on a light-weight alloy steel such as a cold rolled steel sheet (e.g., steel plate cold commercial (SPCC), SPEC, or the like), a hot rolled steel sheet, a stainless steel, a boron or magnesium alloy, or the like, through a single process or an additional process.

Thus, the cover plate 130 according to an embodiment of the present invention may minimize a processing time and energy consumption, resultantly enhancing production capacity.

Also, since the cover plate 130 is made of an iron steel plate or an alloy, overall rigidity of the spindle motor may be enhanced.

The inner wall portion 133, the upper wall portion 135, and the outer wall portion 137 of the cover plate 130 are disposed between the sleeve 120 and the base member 310. Thus, even in the case that a load or external impact is applied in the axial direction or the radial direction, since the inner wall portion 133, the upper wall portion 135, and the outer wall portion 137 of the cover plate 130 support the sleeve 120 and the base member 310, internal components are prevented from being deformed.

Figure 3:
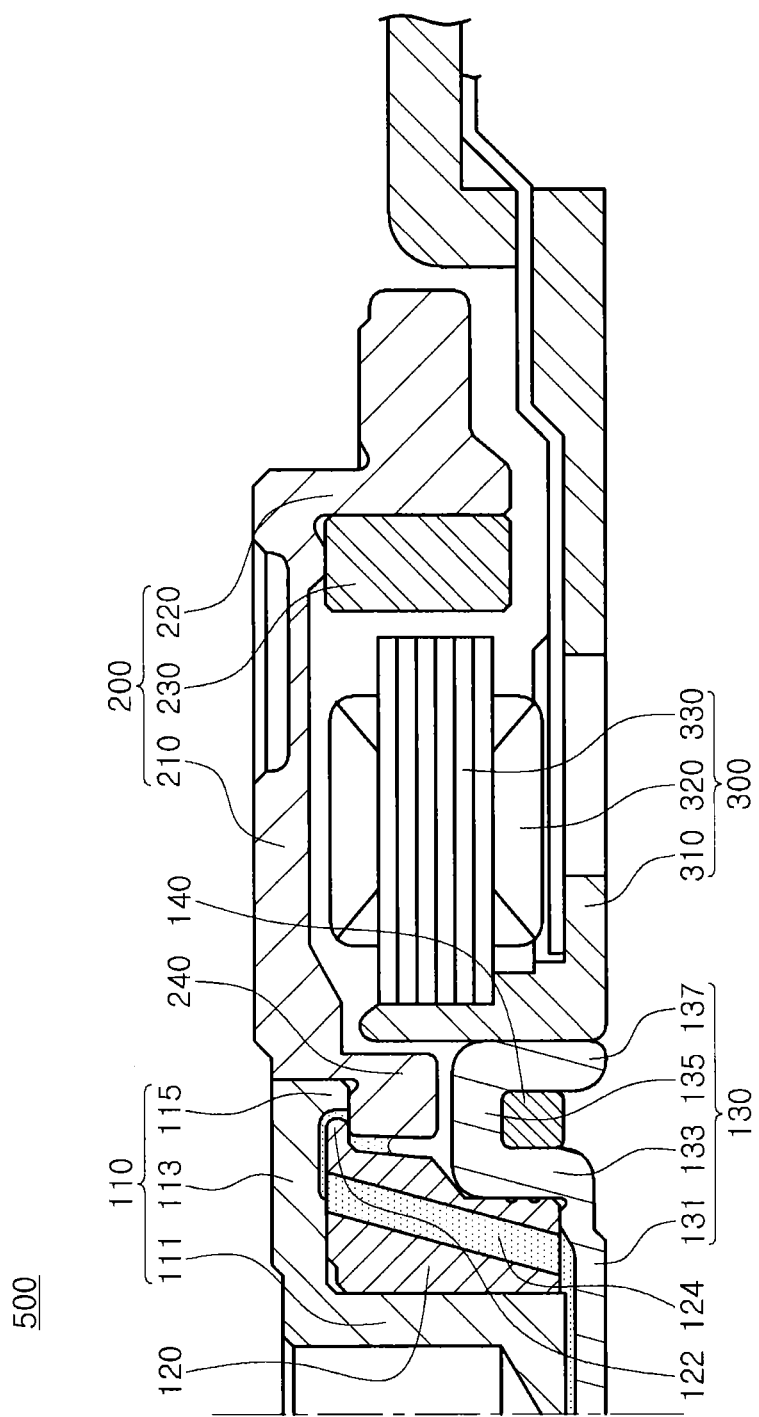
FIG. 3 is a cross-sectional view of half of a spindle motor according to a second embodiment of the present invention.

FIG. 3 is a cross-sectional view of half of a spindle motor according to a second embodiment of the present invention.

Referring to FIG. 3, a spindle motor 500 according to the second embodiment of the present invention has the same configuration as that of the spindle motor 400 according to the first embodiment of the present invention, except for a damping member 140. Thus, a description of components other than the damping member 140 will be omitted.

As the cover plate 130 includes the inner wall portion 133, the outer wall portion 137, and the upper wall portion 135 connecting the upper end of the inner wall portion 133 and the upper end of the outer wall portion 137, a space surrounded by the inner wall portion 133, the upper wall portion 135 and the outer wall portion 137 may be formed in the cover plate 130.

The damping member 140 may be provided in the space in order to reduce noise or vibration of the spindle motor 500.

Since the empty space surrounded by the inner wall portion 133, the upper wall portion 135 and the outer wall portion 137 is filled with the damping member 140, noise or vibrations that may be generated while the spindle motor 500 is being driven may be reduced.

The damping member 140 may be made of plastic, rubber, a resin, aluminum, brass, or a magnesium alloy, but the present invention is not limited thereto and any material may be used to form the damping member 140 as long as it can obtain a noise or vibration reduction effect.

Also, since the empty space is filled with the damping member 140, deformation of the spindle motor 500 due to external impact can be more effectively prevented.

Figure 4:
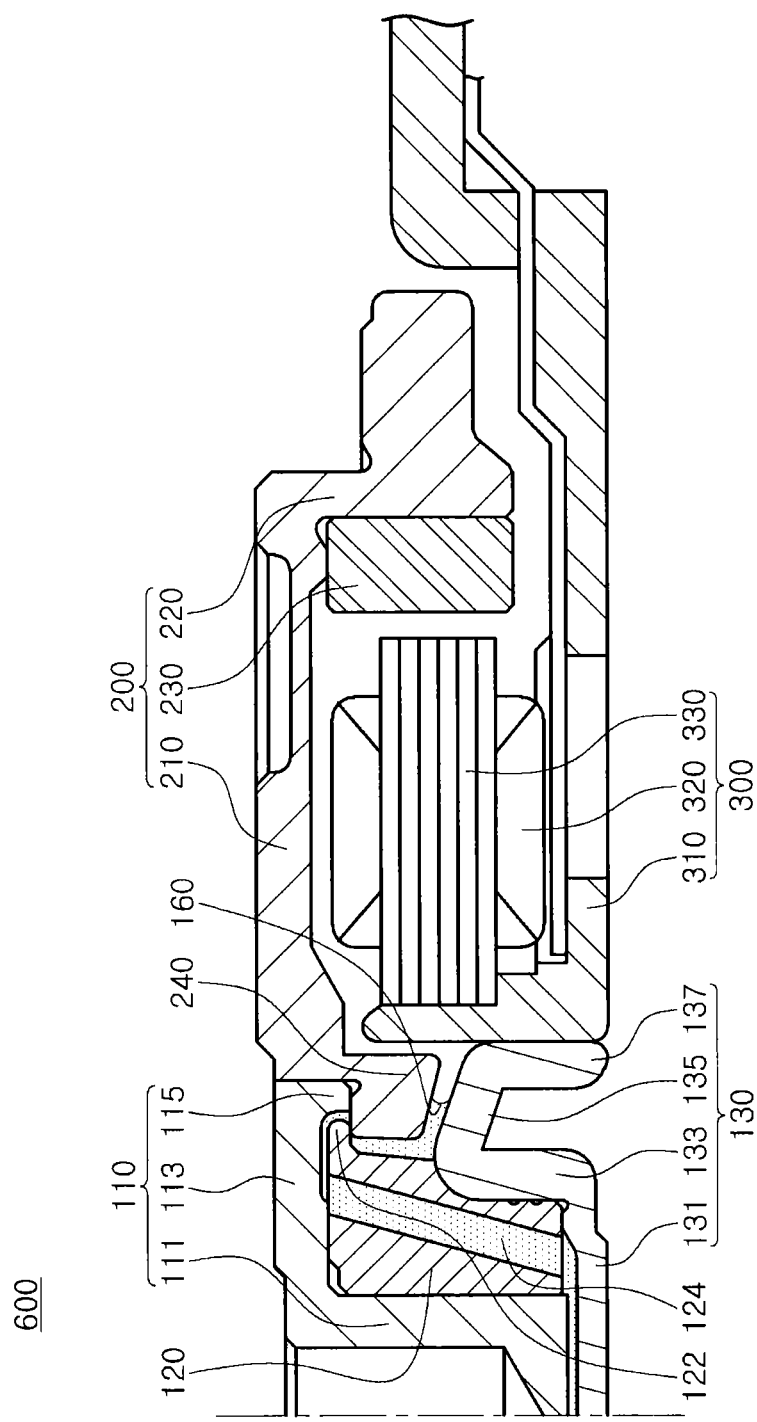
FIG. 4 is a cross-sectional view of half of a spindle motor according to a third embodiment of the present invention.

FIG. 4 is a cross-sectional view of half of a spindle motor according to a third embodiment of the present invention.

Referring to FIG. 4, a spindle motor 600 according to the third embodiment of the present invention has the same configuration as that of the spindle motor 400 according to the first embodiment of the present invention, except for an oil sealing portion 160. Thus, a description of components other than the oil sealing portion 160 will be omitted.

The oil sealing portion 160 may be formed between a lower surface of the stopper unit 240 and an upper surface of the upper wall portion 135 to seal a lubricating fluid therein.

To this end, the lower surface of the stopper unit 240 and the upper surface of the upper wall portion 135 may be disposed to face one another and a predetermined gap may be formed between the stopper 240 and the upper wall portion 135.

The lower surface of the stopper unit 240 and the upper surface of the upper wall portion 135 may be tapered to allow a lubricating fluid to be sealed therein, and specifically, the lower surface of the stopper unit 240 and the upper surface of the upper wall portion 135 may be formed to be sloped downwardly toward the outer edge in the radial direction.

Since a lubricating fluid is sealed between the lower surface of the stopper unit 240 and the upper surface of the upper wall portion 135, increased storage space for the lubricating fluid may be secured relative to the case in which the lubricating fluid is sealed between the outer circumferential surface of the sleeve 120 and the inner circumferential surface of the stopper unit 240, and as a result, a lifespan of the spindle motor can be increased.

While the spindle motor is being driven, the lubricating fluid may be gradually reduced due to factors such as leakage, evaporation, or the like, of the lubricating fluid, failing to provide a sufficient fluid pressure to negatively affect the driving of the spindle motor.

However, in the spindle motor 600 according to the third embodiment of the present invention, since the oil sealing portion 160 is formed between the lower surface of the stopper unit 240 and the upper surface of the upper wall portion 135 to seal a lubricating fluid therein, a sufficient storage space for a lubricating fluid can be secured, and as a result, a lifespan of the spindle motor can be increased.

Figure 5:
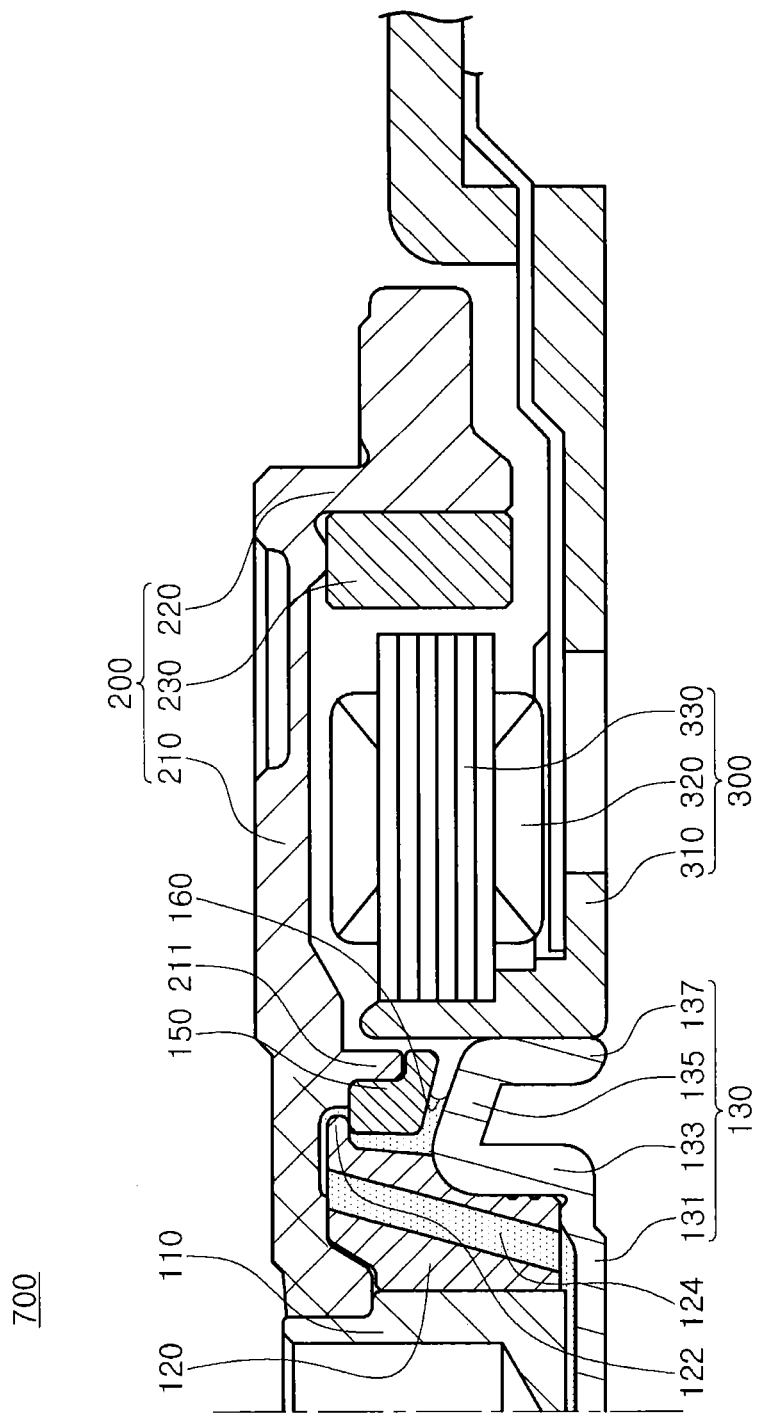
FIG. 5 is a FIG. 3 is a cross-sectional view of half of a spindle motor according to a fourth embodiment of the present invention.

FIG. 5 is a cross-sectional view of half of a spindle motor according to a fourth embodiment of the present invention.

Referring to FIG. 5, a spindle motor 700 according to the fourth embodiment of the present invention has the same configuration as that of the spindle motor 400 according to the first embodiment of the present invention, except for the shaft 110, the rotor 200, and a stopper portion 150. Thus, a description of components other than the shaft 110, the rotor 200, and the stopper portion 150 will be omitted.

In the spindle motor 700 according to the fourth embodiment of the present invention, an upper end of the shaft 110 may be protruded and inserted into a shaft hole of the sleeve 120, and the rotor 200 may be coupled to an upper end of the shaft 110 and rotate in conjunction with the shaft 110.

The rotor 200 may have a main wall portion 211 protruded from one surface of the rotor 200 downwardly in the axial direction.

The stopper portion 150 may be coupled to an inner circumferential surface of the main wall portion 211, and the stopper portion 150 may be disposed such that an inner circumferential surface thereof faces an outer circumferential surface of the sleeve 120.

A lower surface of the stopper 150 and an upper surface of the upper wall portion 135 provided in the cover plate 130 may also be disposed to face one another, and the oil sealing portion 160 may be formed to seal a lubricating fluid between the lower surface of the stopper portion 150 and the upper surface of the upper wall portion 135.

Namely, the main wall portion 211 may be protruded from one surface of the rotor 200 as a rotating member and allow the stopper portion 150 to be fixed to an inner circumferential surface thereof, and lubricating fluid may be sealed between the stopper portion 150 as a rotating member and the upper wall portion 135 as a fixed member.

The lower surface of the stopper portion 150 and the upper surface of the upper wall portion 135 may be tapered to allow a lubricating fluid to be sealed therein. Specifically, the lower surface of the stopper portion 150 and the upper surface of the upper wall portion 135 may sloped downwardly in the outer radial direction.

Since a lubricating fluid is sealed between the lower surface of the stopper portion 150 and the upper surface of the upper wall portion 135, a larger storage space for a lubricating fluid may be secured relative to the case in which the lubricating fluid is sealed between the outer circumferential surface of the sleeve 120 and the inner circumferential surface of the stopper unit 150, and as a result, a lifespan of the spindle motor can be increased.

While the spindle motor is being driven, the lubricating fluid may be gradually reduced due to factors such as leakage, evaporation, or the like, of the lubricating fluid, failing to provide a sufficient fluid pressure to negatively affect the driving of the spindle motor.

However, in the spindle motor 700 according to the fourth embodiment of the present invention, since the oil sealing portion is formed between the lower surface of the stopper unit 150 and the upper surface of the upper wall portion 135 to seal a lubricating fluid therein, a sufficient storage space for a lubricating fluid can be secured, and as a result, a lifespan of the spindle motor can be increased.

Figure 6:
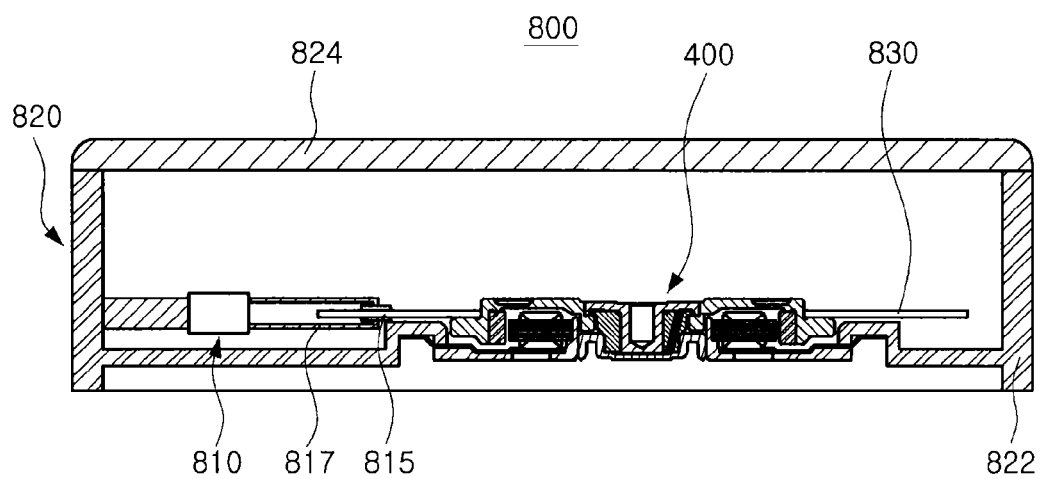
FIG. 6 is a schematic cross-sectional view of a disk driving apparatus using a spindle motor according to an embodiment of the present invention.

FIG. 6 is a schematic cross-sectional view of a disk drive using a spindle motor according to an embodiment of the present invention.

Referring to FIG. 6, a recording disk drive including a spindle motor according to an embodiment of the present invention installed therein may be a hard disk drive and include the spindle motor 400, a head driving unit 810, and a housing 820.

The spindle motor 400 may have all the characteristics of the spindle motor 300 according to an embodiment of the present invention as described above, and may include a recording disk 830 mounted thereon.

The head driving unit 810 may transfer a magnetic head 815 detecting information of the recording disk 830 mounted on the spindle motor 300 to a surface of the recording disk 830 desired to be detected.

Here, the magnetic head 815 may be disposed on a support portion 817 of the head driving unit 810.

In order to form an internal space for accommodating the spindle motor 400 and the head driving unit 810, the housing 820 may include a motor mounting plate 822 and a top cover 824 shielding an upper portion of the motor mounting plate 822.

Through the foregoing embodiments, the spindle motor according to the present invention can have enhanced rigidity, satisfy compactness and thinness requirements, have an increased length of a bearing span. In addition, the presence of the labyrinth sealing portion prevents leakage of a lubricating fluid and an introduction of a foreign object.

As set forth above, in the spindle motor and the hard disk drive including the same according to embodiments of the invention, rigidity of the spindle motor can be enhanced, bearing rigidity can be enhanced while implementing a small and thin spindle motor, and a storage space for a lubricating fluid can be increased.

Also, internal components of the spindle motor can be simplified and manufacturing costs can be reduced.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a shaft including a body portion and an extending portion extending from an upper portion of the body portion in an outer radial direction;
a sleeve rotatably supporting the shaft;
a rotor rotating in conjunction with the shaft and having a stopper portion facing an outer circumferential surface of the sleeve; and
a cover plate coupled to the sleeve, while maintaining a gap with lower portions of the shaft and the sleeve,
wherein the cover plate includes an airtight portion disposed below the shaft and the sleeve, an inner wall portion extending from the airtight portion in an axial direction and coupled to an outer circumferential surface of the sleeve, an outer wall portion coupled to a base member, and an upper wall portion connecting an upper end of the inner wall portion and an upper end of the outer wall portion.

2. The spindle motor of claim 1, wherein the outer circumferential surface of the sleeve and the inner circumferential surface of the stopper portion are tapered, and a lower surface of the stopper portion and an upper surface of the upper wall portion are flat surfaces, respectively.

3. The spindle motor of claim 1, wherein the lower surface of the stopper portion and the upper surface of the upper wall portion are disposed to face one another.

4. The spindle motor of claim 1, wherein the lower surface of the stopper portion and the upper surface of the upper wall portion are tapered.

5. The spindle motor of claim 1, wherein an oil sealing portion is formed between the lower surface of the stopper portion and the upper surface of the upper wall portion to seal a lubricating fluid therein.

6. The spindle motor of claim 1, wherein the lower surface of the stopper portion and the upper surface of the upper wall portion are sloped downwardly toward an outer edge in the radial direction.

7. The spindle motor of claim 1, wherein a damping member is provided in a space surrounded by the inner wall portion, the upper wall portion, and the outer wall portion.

8. The spindle motor of claim 1, wherein the shaft further includes a protrusion portion extending from an end of the extending portion in the axial direction, and the extending portion and the protrusion portion is coupled to the rotor.

9. A hard disk drive comprising:
the spindle motor, according to claim 1, rotating a disk by power applied through a board;
a magnetic head writing data to or reading data from the disk; and
a head driving unit transferring the magnetic head to a certain position above the disk.

10. A spindle motor comprising:
a sleeve rotatably supporting a shaft;
a rotor coupled to an upper end of the shaft and rotating in conjunction therewith;
a stopper portion coupled to a main wall portion protruded from one surface of the rotor and facing an outer circumferential surface of the sleeve; and
a cover plate coupled to the sleeve, while maintaining a gap with lower portions of the shaft and the sleeve,
wherein the cover plate has an inner wall portion extending from the airtight portion in an axial direction and coupled to an outer circumferential surface of the sleeve, an outer wall portion coupled to a base member, and an upper wall portion connecting an upper end of the inner wall portion and an upper end of the outer wall portion.

11. The spindle motor of claim 10, wherein the lower surface of the stopper portion and the upper surface of the upper wall portion is disposed to face one another.

12. The spindle motor of claim 10, wherein the lower surface of the stopper portion and the upper surface of the upper wall portion are tapered.

13. The spindle motor of claim 10, wherein an oil sealing portion is formed between the lower surface of the stopper portion and the upper surface of the upper wall portion to seal a lubricating fluid therein.

14. The spindle motor of claim 10, wherein the lower surface of the stopper portion and the upper surface of the upper wall portion are sloped downwardly toward an outer edge in the radial direction.

\* \* \* \* \*